Jan. 30, 1923. 1,443,663
A. R. TRIST.
DEVICE FOR MAINTAINING LIQUIDS AT A CONSTANT LEVEL IN THEIR CONTAINERS.
FILED FEB. 26, 1921. 2 SHEETS-SHEET 1

INVENTOR
Arthur Ronald Trist

By
his ATTORNEY.

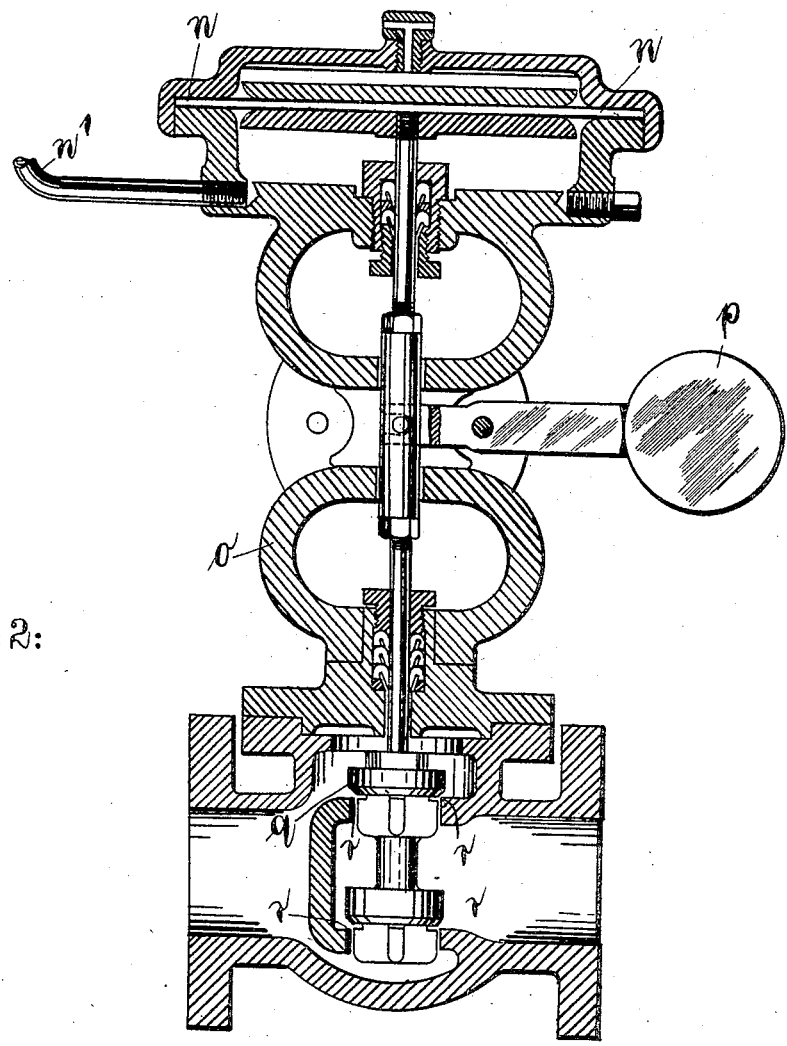

Patented Jan. 30, 1923.

1,443,663

UNITED STATES PATENT OFFICE.

ARTHUR RONALD TRIST, OF LONDON, ENGLAND.

DEVICE FOR MAINTAINING LIQUIDS AT A CONSTANT LEVEL IN THEIR CONTAINERS.

Application filed February 26, 1921. Serial No. 448,130.

*To all whom it may concern:*

Be it known that I, ARTHUR RONALD TRIST, a subject of the King of Great Britain and Ireland, residing at Coronation House, 4 Lloyds Avenue, in the city of London, England, have invented new and useful Improvements in and Relating to Devices for Maintaining Liquids at a Constant Level in Their Containers, of which the following is a specification.

This invention relates to improvements in devices for maintaining liquids at a constant level in their containers, has particular reference to devices for association with liquid containers having pressures varying above and below atmospheric pressure and has for its object the provision of means whereby great accuracy of level is easily maintained by devices of simple and robust construction which can be produced at a very low cost and be cheaply maintained at a standard of great operative efficiency.

In the past feed water regulators suitable for maintaining constant level in steam boilers and the like have been used in which a float chamber adapted to be associated with the boiler or the like is provided with a float mechanically connected to a valve which controls the passage of operative fluid from the float chamber to a power relay device adapted to control the passage of feed water or the like. When such a device is used with ordinary steam pressures no difficulty obtains but if the pressure in the boiler or the like is low or below atmospheric pressure promptness of action is not obtainable and accuracy of level is destroyed.

This invention consists in the arrangement of a separate operative fluid service whose pressure is independent of the pressure in the float chamber, and in the modification of the arrangement described in the specification of British Letters Patent granted to me under No. 19,296 of 1911 thereby ensuring regularity of action and accuracy of level under all pressure conditions that exist in the float chamber and parts associated therewith.

Referring to the drawings, which form part of this specification,

Figure 2 is a sectional elevation of an automatic feed valve suitable for association with the device illustrated in Figure 1.

Figure 1:
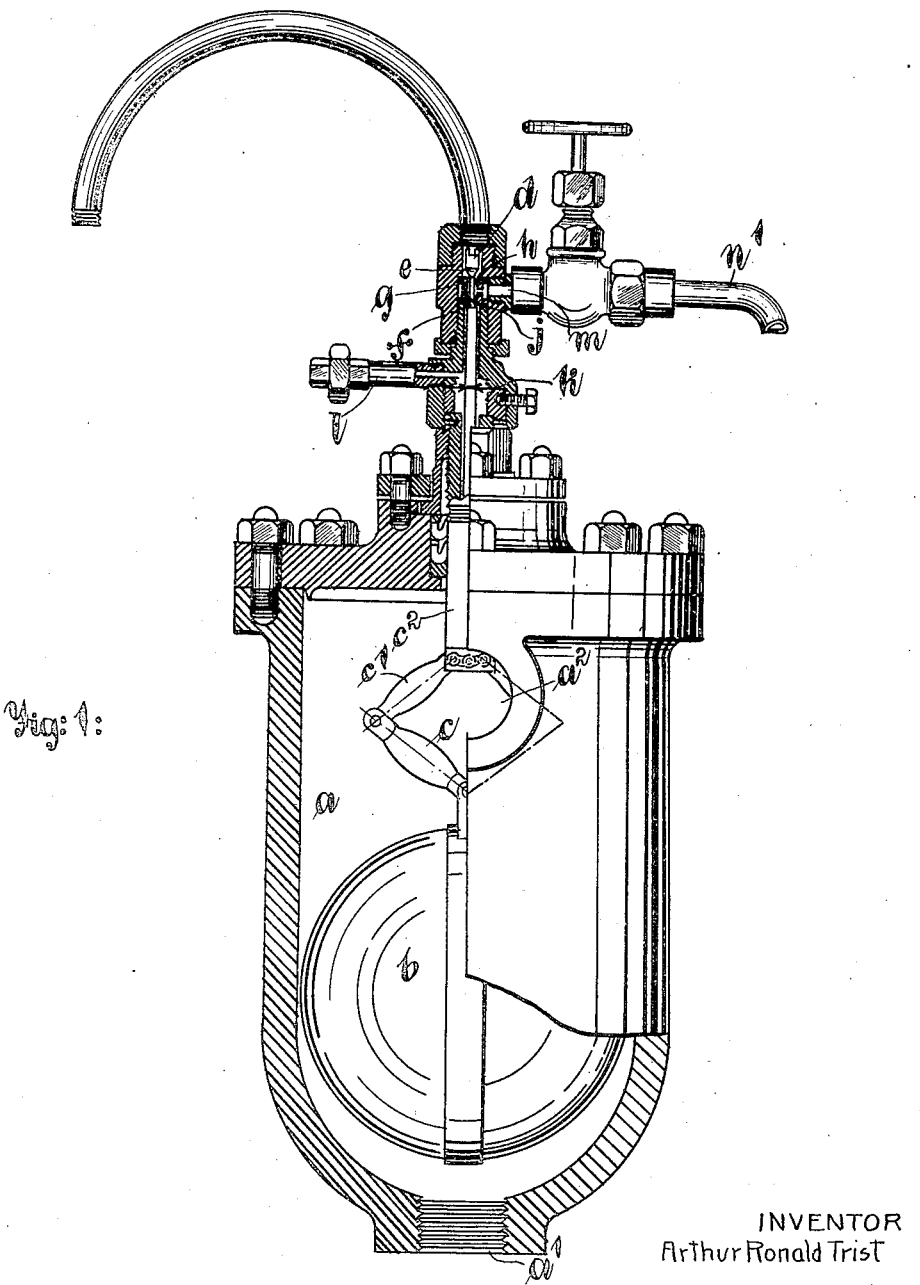
Figure 1 is a sectional elevation of a device constructed in accordance with this invention.

A float chamber $a$ is associated with the vacuum evaporator or the like by pipes to the connections $a^1$ $a^2$ of the float chamber $a$. The float chamber $a$ contains a float $b$ suitably disposed relative to the desired liquid level to be maintained. The float $b$ is connected by means of the links $c$ bell cranks $c^1$ and rod $c^2$ to a valve $d$ having opposed valve faces $e$ and $f$ adapted to coact with the seat member $g$ having opposed valve seats $h$ and $j$. To prevent fluid passing from the float chamber $a$ to the valve $d$ a diaphragm $k$ is provided and between the diaphragm $k$ and the valve $d$ with its seat member $g$ a negative pressure service $l$ is arranged and adapted to convey operative fluid under negative pressure to the valve $d$.

A branch $m$ is provided in proximity to the seat member $g$ and communicating with the space between the seats $h$ and $j$ thereof so as to enable the drop of pressure past the valve face to be conveyed to the underside of the diaphragm $n$ of the automatic feed valve $o$, a pipe or conduit $n'$ being provided for the purpose. The automatic feed valve $o$ operates against the gravity control of the weight $p$ to move the valve $q$ to its seats $r$ to cut off the supply of fluid to the vacuum evaporator or the like associated therewith.

The operation of the device is as follows:—Assuming the level of the liquid to be below that predetermined the float $b$ acting under gravity will be in the position indicated and have moved the valve face $e$ of the valve $d$ off the seat $h$ of the member $g$ and the valve face $f$ onto the seat $j$ through the lever system $c$, $c^1$, $c^2$ associated therewith. The negative pressure through the branch $m$ is therefore cut off from the under side of the diaphragm $n$ of the automatic feed valve $o$. As a consequence the valve $q$ will be moved off its seats $rr$ by the weight $p$ and maintained open until the level in the evaporator or the like reaches that predetermined, the pressure in the diaphragm chamber escaping past the valve face $e$. When the predetermined level is reached the float and its mechanism will move the valve face $f$ off the seat $j$ and the valve $e$ on to the seat $h$ thus admitting negative pressure to the under side of the diaphragm $n$, thereby moving the valve $q$ to its seats $rr$ against the gravity control of the weight $p$. Obviously although a negative pressure power service has been described a positive pressure service may equally well be employed without departing from the invention.

I claim:

1. In a device for maintaining liquids at a constant level in their containers comprising a float operated valve element with opposed valve faces disposed between opposed valve seats adapted to control a power operated feed valve the arrangement of means adapted to isolate the said valve element from the fluid or fluids in the chamber containing the float, and means adapted to supply said valve element and its seats with a fluid under a positive or negative pressure independent of the pressure in the float chamber substantially as described.

2. In a device as claimed in claim 1 the arrangement of a diaphragm between the float chamber and the float operated valve element adapted to isolate said valve element from the fluid or fluids in said chamber and enable the valve element and its seats to be supplied with a fluid the pressure of which is independent of the pressure in the float chamber, substantially as described.

In testimony whereof I have signed my name to this specification in the presence of two subscribing witnesses.

ARTHUR RONALD TRIST.

Witnesses:
 JOHN MARSHALL MASON,
 BEATRICE YEOMANS.